US009551827B2

(12) United States Patent
Kong et al.

(10) Patent No.: US 9,551,827 B2
(45) Date of Patent: Jan. 24, 2017

(54) HOLLOW LIGHT DUCT BEND

(71) Applicant: 3M INNOVATIVE PROPERTIES COMPANY, St. Paul, MN (US)

(72) Inventors: Steven H. Kong, Woodbury, MN (US); David G. Freier, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 111 days.

(21) Appl. No.: 14/371,093

(22) PCT Filed: Jan. 9, 2013

(86) PCT No.: PCT/US2013/020728
§ 371 (c)(1),
(2) Date: Jul. 8, 2014

(87) PCT Pub. No.: WO2013/106365
PCT Pub. Date: Jul. 18, 2013

(65) Prior Publication Data
US 2015/0003102 A1    Jan. 1, 2015

Related U.S. Application Data

(60) Provisional application No. 61/585,403, filed on Jan. 11, 2012.

(51) Int. Cl.
G02B 6/00      (2006.01)
F21V 8/00      (2006.01)
F21V 7/04      (2006.01)
G02B 1/11      (2015.01)

(52) U.S. Cl.
CPC ............... *G02B 6/0096* (2013.01); *F21V 7/04* (2013.01); *G02B 1/11* (2013.01); *F21V 2200/40* (2015.01)

(58) Field of Classification Search
None
See application file for complete search history.

(56) References Cited

U.S. PATENT DOCUMENTS 247,229 A       9/1881   Wheeler
3,181,088 A  *  4/1965   Lewin et al. ........... H01F 1/032
                                                333/122
(Continued)

FOREIGN PATENT DOCUMENTS

DE       767968 C   *   5/1955
JP       57201204       12/1982
(Continued)

OTHER PUBLICATIONS

International preliminary report on patentability for PCT/US2013/020728, dated Jul. 15, 2014.*
(Continued)

*Primary Examiner* — Mike Stahl
(74) *Attorney, Agent, or Firm* — Jeffrey S. Kollodge

(57) ABSTRACT

The disclosure generally relates to efficient hollow light duct bends (200) that are capable of retaining a higher on-axis transmission for partially collimated light propagating within a light duct (220, 230). In particular, the described hollow light duct bends (200) include input and output plates (214, 216) that have low reflectivity for near nonnal incident light, and high reflectivity for near grazing incident light.

17 Claims, 6 Drawing Sheets

(56) References Cited

U.S. PATENT DOCUMENTS

| | | | | |
|---|---|---|---|---|
| 3,692,388 | A * | 9/1972 | Hall et al. | G02F 1/157 359/275 |
| 4,394,860 | A * | 7/1983 | Smith | F24J 2/06 126/680 |
| 4,810,093 | A * | 3/1989 | Doyle | G01J 3/08 356/455 |
| 5,117,478 | A * | 5/1992 | Cobb et al. | F21V 5/00 385/133 |
| 5,604,837 | A * | 2/1997 | Tanaka | G02B 6/032 385/147 |
| 5,610,751 | A * | 3/1997 | Sweeney et al. | G02B 26/10 359/197.1 |
| 5,682,449 | A | 10/1997 | Taira-Griffin | |
| 5,774,608 | A * | 6/1998 | Allen et al. | G02B 6/262 385/121 |
| 5,818,023 | A * | 10/1998 | Meyerson | G06K 7/14 235/462.01 |
| 5,852,693 | A * | 12/1998 | Jeong | G02B 6/262 385/147 |
| 5,856,018 | A | 1/1999 | Chen | |
| 5,933,393 | A * | 8/1999 | Kitajima | G01C 15/004 33/276 |
| 6,188,814 | B1 * | 2/2001 | Bhalla | G02B 6/359 385/134 |
| 7,094,461 | B2 | 8/2006 | Ruff | |
| 7,113,684 | B1 * | 9/2006 | Cianciotto et al. | G02B 6/0096 362/551 |
| 8,251,527 | B1 * | 8/2012 | Freier | G02B 6/0096 359/852 |
| 2001/0028563 | A1 * | 10/2001 | Signer | F21S 11/00 362/147 |
| 2003/0223237 | A1 * | 12/2003 | Janssen | G02B 6/00 362/249.01 |
| 2005/0084212 | A1 * | 4/2005 | Fein | G02B 6/102 385/39 |
| 2008/0239526 | A1 * | 10/2008 | Takeda et al. | G02B 6/00 359/833 |
| 2011/0044741 | A1 * | 2/2011 | Matsubara et al. | G03G 15/2007 399/335 |
| 2011/0261271 | A1 * | 10/2011 | Yamagishi et al. | H04N 9/3152 348/744 |
| 2011/0272002 | A1 * | 11/2011 | Liu | F21S 11/007 136/246 |

FOREIGN PATENT DOCUMENTS

| | | |
|---|---|---|
| JP | 59-202405 * | 11/1984 |
| WO | WO 2010-120468 | 10/2010 |
| WO | WO 2013-148124 | 10/2013 |

OTHER PUBLICATIONS

International Search Report for PCT International Application No. PCT/US2013/020728, mailed on Apr. 5, 2013, 4 pages.

* cited by examiner

HOLLOW LIGHT DUCT BEND

CROSS REFERENCE TO RELATED APPLICATIONS

This application is a national stage filing under 35 U.S.C. 371 of PCT/US2013/020728, filed Jan. 9,2013, which claims priority to U.S. Provisional Application No. 61/585403, filed Jan. 11, 2012, the disclosure of which is incorporated by reference in its/their entirety herein.

BACKGROUND

The long-distance transport of visible light can use large mirror-lined ducts, or smaller solid fibers which exploit total internal reflection. Mirror-lined ducts include advantages of large cross-sectional area and large numerical aperture (enabling larger fluxes with less concentration), a robust and clear propagation medium (that is, air) that leads to both lower attenuation and longer lifetimes, and a potentially lower weight per unit of light flux transported. Solid fibers include the advantage of configuration flexibility, which can result in relatively tight bends with low light loss. While the advantages of mirror-lined ducts may appear overwhelming, fibers are nevertheless frequently selected because of the practical value of assembling light conduits in much the same fashion as plumbing. Efficient low-loss light-ducting systems fabricated in a fashion similar to plumbing, or heating, ventilating and air-conditioning (HVAC) ductwork is desired.

SUMMARY

The disclosure generally relates to efficient hollow light duct bends that are capable of retaining a higher on-axis transmission for partially collimated light propagating within a light duct. In particular, the described hollow light duct bends include input and output plates that have low reflectivity for near normal incident light, and high reflectivity for near grazing incident light. In one aspect, the present disclosure provides a hollow light duct bend that includes an input plate; an orthogonal output plate adjacent to the input plate; and a diagonal reflector disposed at a 45 degree angle between the input plate and the output plate. The input plate and the output plate each have a first low reflectivity for light incident within a collimation half-angle $\theta$ of the normal to the respective plate, and a second high reflectivity for light incident within a grazing angle (90-$\theta$) of the normal to the respective plate. In yet another aspect, the present disclosure provides a light distribution system that includes the hollow light duct bend; a mirror-lined hollow light duct connected to the hollow light duct bend; and a light source capable of injecting an input light beam into the mirror-lined hollow light duct.

In another aspect, the present disclosure provides a hollow light duct bend that includes an input plate; an output plate adjacent and orthogonal to the input plate; and a diagonal reflector between the input plate and the output plate. Further, the input plate has a first low reflectivity for light incident within a collimation half-angle $\theta$ of the normal to the input plate, and a first high reflectivity for light incident within a grazing angle (90-$\theta$) of the normal to the input plate. Still further, the output plate has a second low reflectivity for light incident within the collimation half-angle $\theta$ of a normal to the output plate, and a second high reflectivity for light incident within the grazing angle (90-$\theta$) of the normal to the output plate. An input light beam having light within the collimation half-angle $\theta$ that enters normal to the input plate, exits the output plate as an output light beam having light within the collimation half-angle $\theta$. In yet another aspect, the present disclosure provides a light distribution system that includes the hollow light duct bend; a mirror-lined hollow light duct connected to the hollow light duct bend; and a light source capable of injecting an input light beam into the mirror-lined hollow light duct.

In yet another aspect, the present disclosure provides a hollow light duct bend that includes an input plate disposed perpendicular to an input light propagation direction; an output plate disposed perpendicular to the input plate and perpendicular to an output light propagation direction; and a reflector disposed along a diagonal between the input plate and the output plate. A partially collimated input light beam that enters the input plate and exits the output plate as a partially collimated output light beam, includes: a first portion that reflects from the reflector and passes through the output plate; a second portion that reflects from the reflector, reflects from the input plate, and then passes through the output plate; and a third portion that reflects from the output plate, reflects from the reflector, and then passes through the output plate. In yet another aspect, the present disclosure provides a light distribution system that includes the hollow light duct bend; a mirror-lined hollow light duct connected to the hollow light duct bend; and a light source capable of injecting an input light beam into the mirror-lined hollow light duct.

In yet another aspect, the present disclosure provides a hollow light duct bend that includes at least one of an input plate or an orthogonal output plate adjacent to the input plate, and a diagonal reflector disposed at a 45 degree angle to the at least one input plate or the orthogonal output plate. The input plate and the output plate each have a first low reflectivity for light incident within a collimation half-angle $\theta$ of the normal to the respective plate, and a second high reflectivity for light incident within a grazing angle (90-$\theta$) of the normal to the respective plate. In yet another aspect, the present disclosure provides a light distribution system that includes the hollow light duct bend; a mirror-lined hollow light duct connected to the hollow light duct bend; and a light source capable of injecting an input light beam into the mirror-lined hollow light duct.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
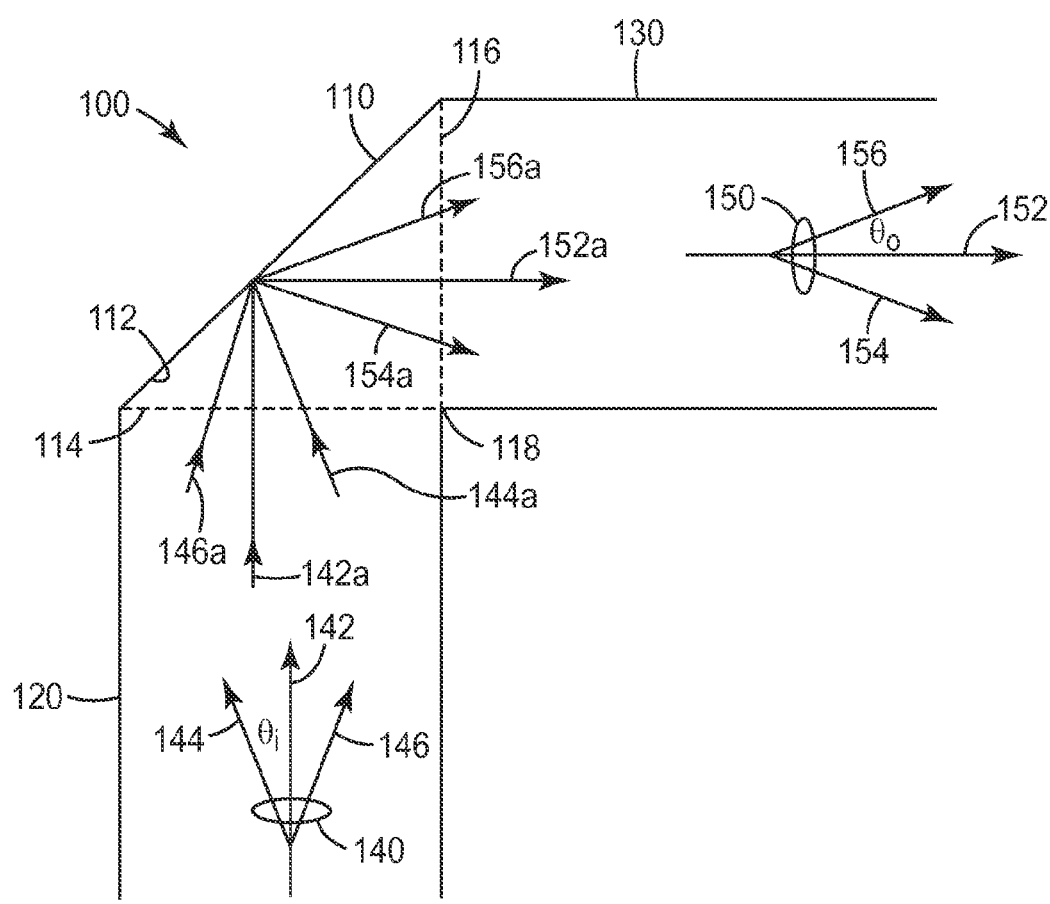
FIGS. 1A-1B show a cross-sectional schematic of light rays travelling through a hollow light duct bend.

Architectural daylighting using mirror-lined light ducts can deliver sunlight deep into the core of multi-floor buildings. Architectural daylighting is a multi-component system that includes a device for collecting sunlight, and light ducts and extractors for transporting and distributing the sunlight within the building. The typical benefits of using sunlight for interior lighting can include a reduction of energy for office lighting by an average of 25%, improved light quality due to the full spectrum light delivered, and is often more pleasing to office occupants. One of the components of the light ducting portion of the system is the ability to bend the duct up to 90 degrees or more, to accommodate building features that would prevent a straight run of the duct in the building. Without the ability to turn the light efficiently via corners or bends in the duct, any architectural daylighting system would be limited to straight ducts only, which could significantly reduce the attractiveness of using sunlight for interior lighting. Bends that can efficiently re-direct the light in the duct are needed.

Ideally, one would like all rays which enter a bend possessing a direction within a collimation half-angle $\theta$ of the inlet-duct axis to exit the bend without loss and possessing a direction within the collimation half-angle $\theta$ of the outlet-duct axis. Such a response will preserve the collimation of light, so that the inclusion of one or more bends will have no effect upon the downstream design or performance of the system.

The present disclosure provides a novel construction for a bend in a mirror-lined light duct. In one particular embodiment, the present disclosure addresses the ability to conduct light with only minor loss and/or disruption of collimation about one or more bends in the ductwork system. The described light duct bend can be applied to both in-plane and out-of-plane bends of an arbitrary angle, however 90 degree bends are preferred. In one particular embodiment, the light duct bend can be more effective by using very high efficiency mirrors such as, for example, Vikuiti™ Enhanced Specular Reflector (ESR) film available from 3M Company.

In one particular embodiment, the light injected into the light duct is partially collimated light due to the method of light generation, whether the light originates from the sun or an artificial light source. This partially collimated light can generally be described as being included within a cone having border light rays within a collimation half-angle $\theta$ of the central light propagation direction.

In some cases, solar radiation can be collected and concentrated to be injected into the light duct, and/or artificial light from various sources can be injected into the light duct. Relatively well-collimated light can be more effectively used in mirror-lined duct systems for transporting light. For example, as sunlight is concentrated, the collimation angle will increase from the input collimation angle of sunlight, about ¼ degree. Generally, the collimation half-angle $\theta$ of concentrated light, such as sunlight, passing into the light duct should be restricted to no greater than about 30 degrees, or no greater than about 25 degrees, or no greater than about 20 degrees, or even no greater than about 15 degrees. In one particular embodiment, the collimation half-angle $\theta$ can be about 12.9 degrees, or about 18.4 degrees, or about 22.8 degrees, or about 26.6 degrees, or about 30 degrees. The accuracy of tracking the sun, as well as the accuracy of the various optical components for injecting the light into the duct, all can contribute to the resulting collimation half-angle $\theta$.

Figure 1B:
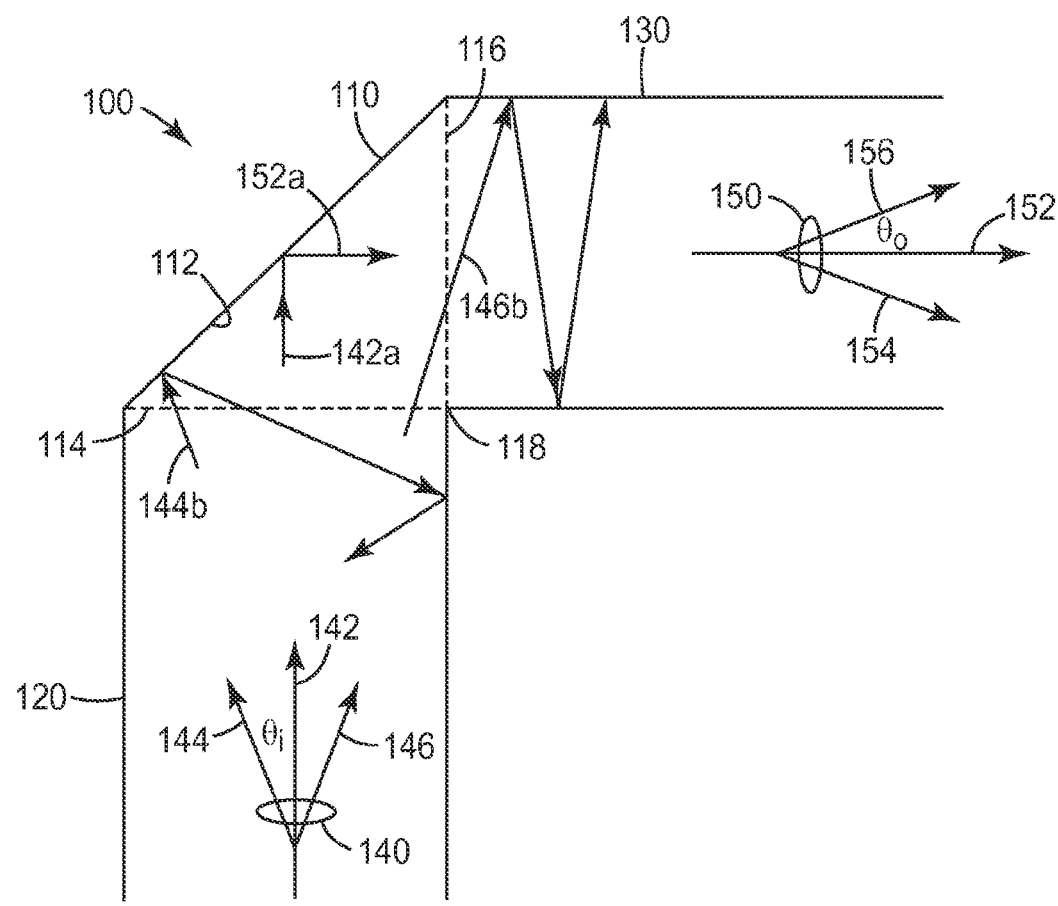

FIGS. 1A-1B show a cross-sectional schematic of light rays travelling through a hollow light duct bend 100, and exhibits two principal causes of inefficiency and decollimation in simple 90-degree bends, according to one aspect of the disclosure. Hollow light duct bend 100 is positioned between an input light duct 120 and an output light duct 130, and includes a diagonal reflector 110 having a reflective surface 112, an input light region 114 spanning the input light duct 120, and an output light region 116 spanning the output light duct 130. The input light duct 120 and output light duct 130 meet to form a corner 118 that forms the intersection of the input light region 114 and output light region 116.

FIGS. 1A-1B shows a partially collimated input light 140 that includes input central ray 142 travelling in the input propagation direction, first input boundary ray 144, and second input boundary ray 146. First input boundary ray 144 and second input boundary ray 146 are included within an input collimation half-angle $\theta i$ of the input central ray 142 travelling in the input propagation direction. FIGS. 1A-1B also shows a partially collimated output light 150 that includes output central ray 152 travelling in the output propagation direction, first output boundary ray 154, and second output boundary ray 156. First output boundary ray 154 and second output boundary ray 156 are included within an output collimation half-angle $\theta o$ of the output central ray 152 travelling in the output propagation direction. In one particular embodiment, input collimation half-angle $\theta i$ and output collimation half-angle $\theta o$ can be the same and referred to as simply the collimation half-angle $\theta$; however, in some cases they may be different due to spreading or other optical effects.

FIG. 1A shows a representative first portion of partially collimated input light 140 that is transmitted efficiently through light duct bend 100 to emerge as partially collimated output light 150 that includes output central ray 152 travelling in the output propagation direction, first output boundary ray 154, and second output boundary ray 156. First output boundary ray 154 and second output boundary ray 156 are included within an output collimation half-angle $\theta o$ of the output central ray 152 travelling in the output propagation direction. Representative input central, first boundary, and second boundary light rays 142a, 144a, 146a, specularly reflect from reflective surface 112 to become representative output central, first boundary, and second boundary light rays 152a, 154a, 156a included within output collimation half-angle $\theta o$.

FIG. 1B shows representative second and third portions of partially collimated input light 140 that are not transmitted efficiently through light duct bend 100. The first cause of inefficiency and decollimation occurs due to light rays incident near the outer edge of the input surface 114, such as represented by second portion boundary ray 144b, which travels in a direction whose off-axis component points toward the outer edge of light duct bend 100. Subsequent to reflection from the 45-degree reflective surface 112 within the bend, these rays can re-enter the inlet duct at a large angle relative to the axis of this duct; generally opposite the central light ray 142 propagation direction. The second cause of inefficiency and decollimation occurs due to light rays incident near the inner edge (for example, corner 118) of the input surface 114, such as represented by third portion boundary ray 146b, which travels in a direction whose off-axis component points toward the inner edge (for example, corner 118) of light duct bend 100. These rays will frequently miss the 45-degree reflective surface 112 within the light duct bend 100, and enter the outlet duct 130 at a high angle relative to the axis of that duct.

Four different classifications of the light travelling through the hollow light duct can be defined: off-axis reflection, off-axis transmission, on-axis transmission, and on-axis reflection. Second portion boundary ray 144b contributes to what can be termed 'off-axis reflection'; 'reflection' because this light is redirected back down the inlet duct 120, and 'off-axis' because it propagates at an angle between (90-θi) and 90 degrees of the input duct axis shown by input central ray 142 (as opposed to within θi of the duct axis). Third portion boundary ray 146*b* contributes to what can be termed 'off-axis transmission'; 'transmission' because this light enters the outlet duct 130, and 'off-axis' because it does so at an angle between (90-θo) and 90 degrees of the output light duct axis shown by output central ray 152 (as opposed to within θo of the duct axis). 'On-axis transmission' includes light which enters the outlet duct 130 at an angle between 0 and θo degrees of the duct axis. On-axis transmission is desirable—an ideal bend would exhibit 100 percent on-axis transmission. There are two remaining classifications: 'on-axis reflection' refers to light which is redirected down the inlet duct 120 at an angle between 0 and θi degrees of the duct axis, and 'absorption' refers to light which is consumed by, for example, less-than-perfect reflection from the reflective surfaces. The total of the on- and off-axis reflection, the on- and off-axis transmission, and the absorption is always 100 percent.

A technique of dramatically decreasing loss and decollimation in bends can include filling the bend segment with an extremely-clear medium of index 1.5 or greater that has very-low reflectivity anti-reflective (AR) coatings on the interfaces with the inlet and outlet ducts. In effect, the bend segment can be replaced by a solid turning prism with anti-reflective input and output surfaces. The primary impact is to introduce total internal reflection (TIR) at the interfaces, to redirect rays that are reflected back toward the inlet duct to instead enter into the outlet duct, and also to prevent the direct transmission of off-axis rays into the outlet duct. Anti-reflective coatings are included to avoid the reflection of near-normal incident light at each interface, which would otherwise contribute to on-axis reflection from the bend.

Unfortunately, the implementation of turning prisms in ducting systems of substantial width and height presents many formidable challenges. These include the cost and weight of such a large volume of plastic or glass, the stringent requirements upon the absorptivity imposed by widths in excess of approximately one foot, the need to maintain low absorptivity throughout prolonged exposure to intense illumination, and the stringent suppression of bubbles, inclusions, and scratches necessary to avoid the introduction of scattering. In addition, a solid acrylic prism for a 2-foot by 1-foot ducting system would weigh approximately 31 pounds (perhaps even twice that for glass). Further, the absorptivity would need to be less than approximately 0.1% in$^{-1}$ (to attain 97-percent transmission). Although this is possible by ultra-purification of acrylic resins, more common and less expensive acrylics possess absorptivities between 0.2 and 1.0% in$^{-1}$. The challenges diminish rapidly as the dimensions of the duct decrease; for example for 6-inch by 6-inch ducts, the weight would be about 1 pound, and the permissible absorptivity could be as high as 0.4% in$^{-1}$.

A construction is described that can be implemented in systems with large ducts which can substantially diminish the power lost in a 90-degree bend relative to that for a simple 45-degree reflector. The construction would preferably diminish the loss to a value comparable to that for a non-absorbing solid prism (approximately one-percent loss). In one particular embodiment, this can be accomplished by reproducing as closely as possible the functions of the solid prism using plates on the inlet and outlet apertures of an air-filled bend segment. The desired functional attributes of the plates are specularity with very-low reflectivity for near-normal incidence, and very-high reflectivity for near-grazing incidence. A plate possessing such a reflectivity without absorption can essentially eliminate off-axis reflection and transmission and not introduce any on-axis reflection, and so will yield an on-axis transmission equal to one minus the loss incurred in one or two bounces off the reflective surfaces. A plate possessing the ideal reflectivity for a given input light collimation half-angle θi will ensure this ideal performance for any half angle of incidence less than or equal to θi.

As described herein, it is to be understood that at least one of an inlet plate or an outlet plate can be used to improve the transmission through the light duct bend. In some cases, only an inlet plate can be used; in some cases, only an outlet plate can be used; in some cases, both an inlet plate and an outlet plate can be used to improve the transmission through the light duct bend. Generally, use of both an inlet plate and an outlet plate can provide a higher transmission, and as such, the description provided herein is directed to light duct bends having both plates, as shown in the figures. However, one of ordinary skill in the art would understand that inclusion of either the inlet plate or the outlet plate (but not both) could also improve transmission through the light duct bend over the case where there are no plates present. Further, it is to be understood that any desired number of inlet and/or outlet plates can be stacked together and used in the bend.

Figure 2A:
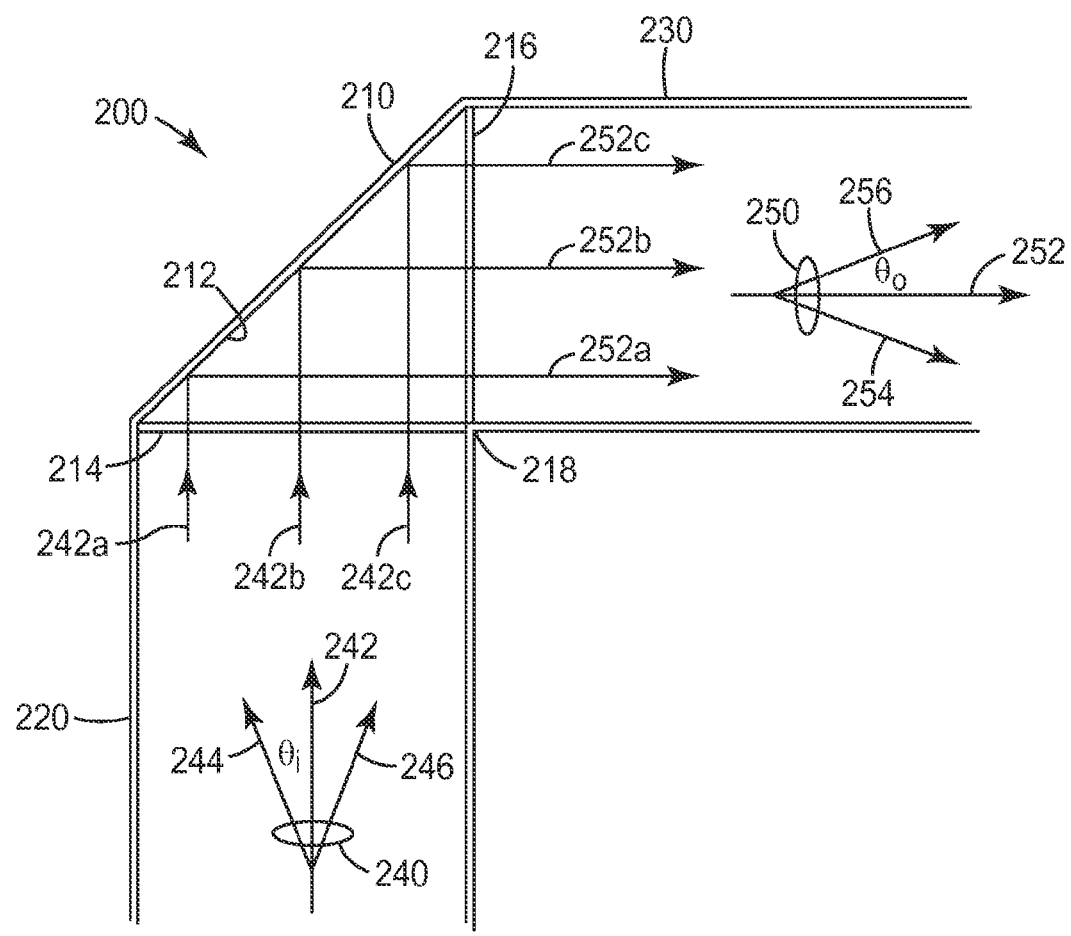
FIGS. 2A-2C show a cross-sectional schematic of light rays travelling through a hollow light duct bend.
Figure 2B:
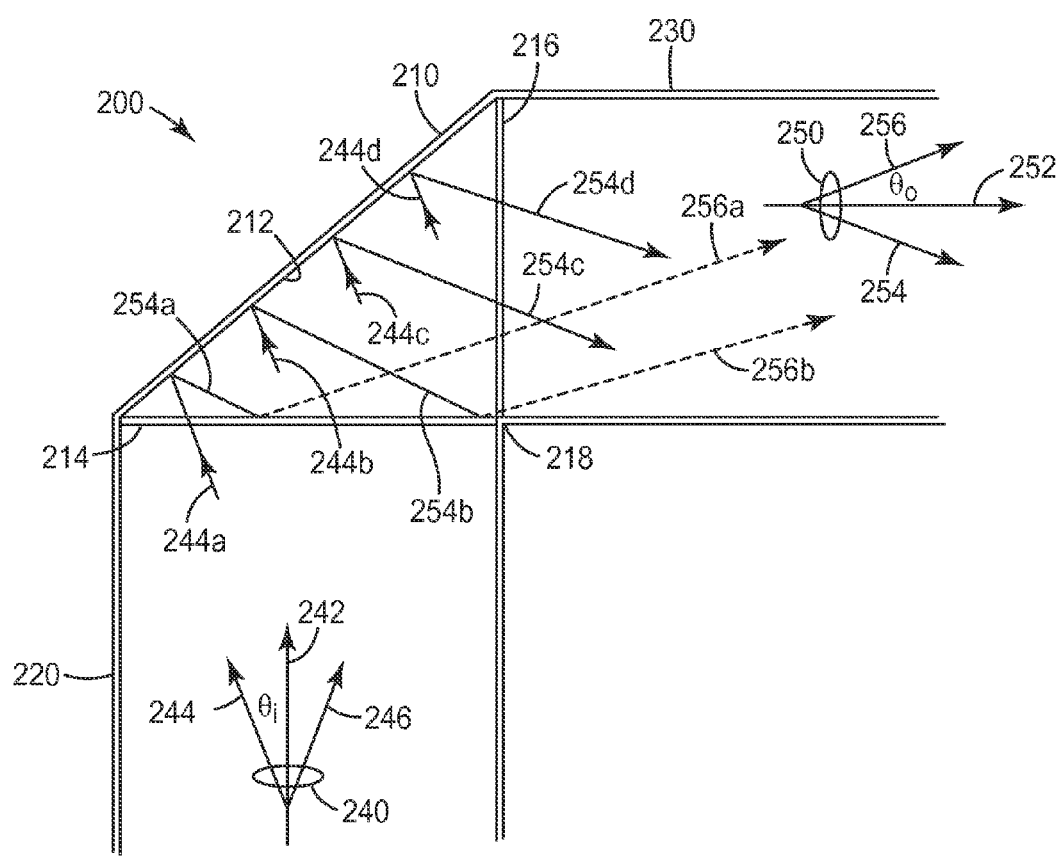
Figure 2C:
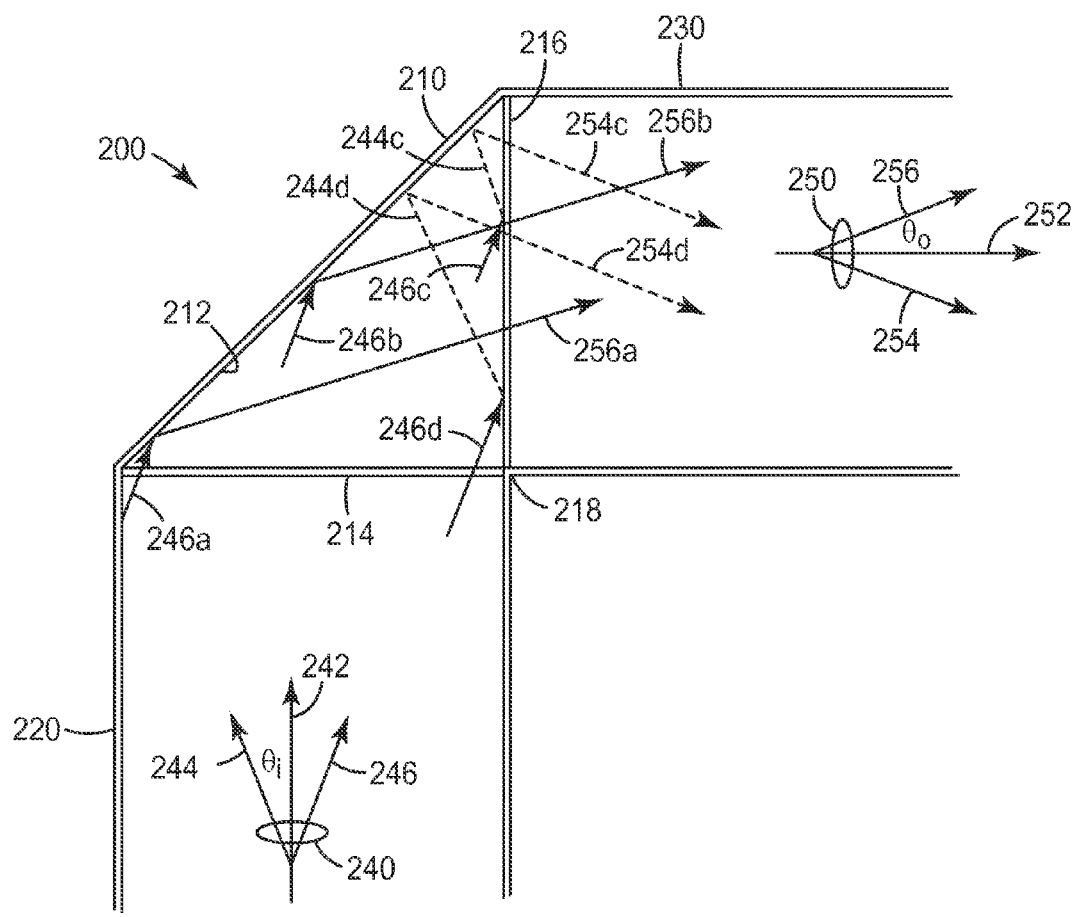

FIGS. 2A-2C show a cross-sectional schematic of light rays travelling through a hollow light duct bend 200, according to one aspect of the disclosure. The hollow light duct bend 200 is a 90-degree bend in a hollow mirror-lined light-ducting system that results in high transmission of partially-collimated light without substantial decollimation of the incident distribution. The high transmission is achieved by using clear plastic or glass plates that cover the inlet and outlet apertures of the bend segment. These plates can include anti-reflective coatings on both surfaces to minimize the reflection of near-normal incident light, and may also include an embedded multi-layer optical film stack or other structure to increase the near-grazing reflectivity without diminishing the near-normal transmission, as described elsewhere.

In FIGS. 2A-2C, hollow light duct bend 200 is positioned between an input light duct 220 and an output light duct 230, and includes a diagonal reflector 210 having a reflective surface 212, an input plate 214 spanning the input light duct 220, and an output plate 216 spanning the output light duct 230. The input light duct 220 and output light duct 230 meet to form a corner 218 that forms the intersection of the input plate 214 and output plate 216.

FIGS. 2A-2C shows a partially collimated input light 240 that includes input central ray 242 travelling in the input propagation direction, first input boundary ray 244, and second input boundary ray 246. First input boundary ray 244 and second input boundary ray 246 are included within an input collimation half-angle θi of the input central ray 242 travelling in the input propagation direction. FIGS. 2A-2C also shows a partially collimated output light 250 that includes output central ray 252 travelling in the output propagation direction, first output boundary ray 254, and second output boundary ray 256. First output boundary ray 254 and second output boundary ray 256 are included within an output collimation half-angle θo of the output central ray 252 travelling in the output propagation direction. In one particular embodiment, input collimation half-angle θi and output collimation half-angle θo can be the same and referred to simply as the collimation half-angle θ; however, in some cases they may be different due to spreading or other optical effects.

FIG. 2A shows a representative first portion of partially collimated input light 240 that includes input central rays (242a, 242b, 242c), which are transmitted efficiently through light duct bend 200 to emerge as partially collimated output light 250 that includes output central rays (252a, 252b, 252c) travelling in the output propagation direction. Input central rays (242a, 242b, 242c) enter light duct bend 200 normal to the input plate 214, reflect from reflective surface 212, and pass through to the output light duct 230 normal to the output plate 216, and as such, the reflection loss from input plate 214 and output plate 216 is minimal.

FIG. 2B shows a representative first portion of partially collimated input light 240 that includes input first boundary rays (244c, 244d) that are transmitted efficiently through light duct bend 200 to emerge as a first portion of partially collimated output light 250 that includes output first boundary rays (254c, 254d) travelling within output collimation half-angle θo of the output propagation direction. Input first boundary rays (244c, 244d) enter light duct bend 200 within input collimation half-angle θi to the input plate 214, reflect from reflective surface 212, and pass through to the output light duct 230 within output collimation half-angle θo to the output plate 216, and as such, the reflection loss from these plates in minimal, and related to reflectivity of each plate at the respective collimation half-angle θi, θo.

FIG. 2B further shows a representative second portion of partially collimated input light 240, that includes input first boundary rays (244a, 244b), that are transmitted with slightly lower efficiency through light duct bend 200. Input first boundary rays (244a, 244b) emerge as a second portion of partially collimated output light 250 that includes output second boundary rays (256a, 256b), travelling within output collimation half-angle θo of the output propagation direction. Input first boundary rays (244a, 244b) enter light duct bend 200 within input collimation half-angle θi to the input plate 214, reflect as first reflected output light rays (254a, 254b) from reflective surface 212, reflect again as second reflected output rays (256a, 256b) from input plate 214 at a grazing angle, and pass through to the output light duct 230 within output collimation half-angle θo to the output plate 216, and as such, the reflection loss from the input plate 214 depends on the grazing angle reflectivity of the first plate, and the reflection loss from the output plate 216 depends on the reflectivity at the collimation half-angle θo.

FIG. 2C shows a representative first portion of partially collimated input light 240 that includes input second boundary rays (246a, 246b) that are transmitted efficiently through light duct bend 200 to emerge as a first portion of partially collimated output light 250 that includes output second boundary rays (256a, 256b) travelling within output collimation half-angle θo of the output propagation direction. Input second boundary rays (246a, 246b) enter light duct bend 200 within input collimation half-angle θi to the input plate 214, reflect from reflective surface 212, and pass through to the output light duct 230 within output collimation half-angle θo to the output plate 216, and as such, the reflection loss from these plates in minimal, and related to reflectivity of each plate at the respective collimation half-angle θi, θo.

FIG. 2C further shows a representative third portion of partially collimated input light 240, that includes input second boundary rays (246c, 246d), that are transmitted with slightly lower efficiency through light duct bend 200. Input second boundary rays (246c, 246d) emerge as a third portion of partially collimated output light 250 that includes output first boundary rays (254c, 254d), travelling within output collimation half-angle θo of the output propagation direction. Input second boundary rays (246c, 246d) enter light duct bend 200 within input collimation half-angle θi to the input plate 214, reflect from output plate 216 at a grazing angle, reflect again as first reflected boundary output rays (254c, 254d) from reflective surface 212, pass through to the output light duct 230 within output collimation half-angle θo to the output plate 216. The reflection loss from the input plate 214 depends on the reflectivity at the collimation half-angle θi, and the reflection loss from the output plate 216 depends on the reflectivity at the collimation half-angle θo and the grazing angle reflectivity.

EXAMPLES

The magnitude of each of the four classifications of light for a simple 90-degree bend was calculated as a function of the collimation of the incident light and the aspect ratio of the ducts. These results were determined via ray-trace simulation for perfectly-reflecting mirrored inlet and outlet ducts affixed to an ESR-lined bend segment. The 'width' can be defined as the dimension of the ducts in the plane of the bend, the 'height' can be defined as their dimension out of this plane, and the aspect ratio is the ratio of the height to the width. The performance is independent of simultaneous and equal scaling of the height and width. The distal cross section of the inlet duct was uniformly filled with uniformly-bright luminance confined to incident directions within input collimation half-angles of 12.9°, 18.4°, 22.8°, 26.6°, or 30.0° of the duct axis. Reflected and transmitted power was accumulated according to direction in the distal cross sections of the inlet and outlet ducts, respectively. The inlet and outlet ducts were assumed perfectly reflecting so that the simulation results indicated the performance of the bend segment alone, as opposed to that of the bend segment in combination with finite-length ESR-lined ducts. All evaluations were performed using material properties (for example, ESR reflectivity) at a wavelength λ=530 nm.

The on-axis transmission was nearly independent of the aspect ratio. In the case where the top and bottom surfaces were perfectly reflecting, the bend would behave identically to a translationally-invariant version of infinite aspect ratio. This limit is closely approached even for aspect ratios as small as ¼ because of the near-perfect reflectivity of ESR (R≈99.5%). It follows that the efficiencies of in-plane and out-of-plane bends were nearly the same.

The on-axis transmission diminished rapidly with decreasing collimation (increasing θi), and the primary detriments are off-axis reflection and transmission, as described elsewhere, and make nearly identical contributions to the detriment. The absorption was shown to be relatively minor, indicating that the primary impediment to high-efficiency bends is not mirror reflectivity, but rather the geometry of the construction. The on-axis transmission was approximately 90 percent for an input collimation half-angle θi=12.9 degrees, and 77 percent for θi=30.0 degrees. Equivalently, the power within the original collimation cone is reduced by 10 percent for θi=12.9 degrees, and 23 percent for θi=30.0 degrees.

Figure 3A:
FIGS. 3A-3D show exemplary input and output plates useful in a hollow light duct bend.
Figure 3B:
Figure 3C:
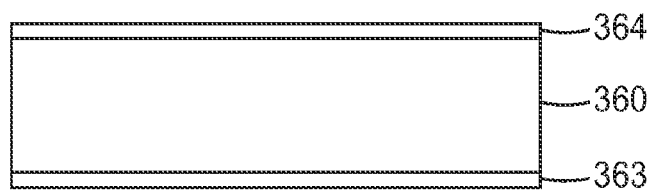
Figure 3D:
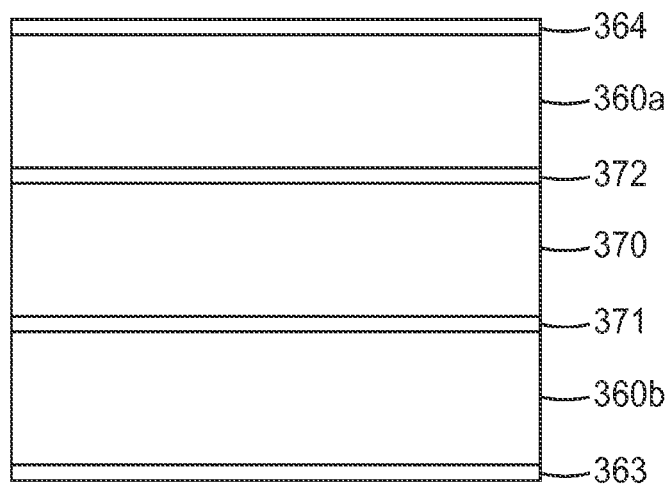

FIGS. 3A-3D show exemplary input and output plates useful in a hollow light duct bend. FIG. 3A shows an acrylic plate 360, FIG. 3B shows an acrylic plate 360 having an antireflective (AR) coating (361, 362) on each major surface. The AR coating can be the same or different on each side, and can be any known coating, such as, for example, a 100 nm coating of MgF having an index of refraction of 1.38. FIG. 3C shows an acrylic plate 360 having a low-index coating, such as a 100 nm thick nanovoided coating having an index of refraction about 1.22 as described, for example, in PCT Patent Publication WO2010/120468 entitled "Process and Apparatus for a Nanovoided Article". FIG. 3D shows a multilayer optical film 370 having skin layers (371, 372) on opposing major surfaces, sandwiched between acrylic plates (360a, 360b). Each of the acrylic plates (360a, 360b) include a low-index coating (363, 364) on an exterior major surface. The included skin layers can have an index of refraction of 1.57, and the low-index coating can be an AR coating or a nanovoided coating as described above.

A ray-tracing simulation was performed on each of the plates shown in FIGS. 3A-3D for a light duct corner as shown in FIGS. 2A-2C. The values of the reflectivity shown in Table 1 were further averaged over the ranges 0≤θ≤θi and (90°-θi)≤θ≤90° for each of θi=12.9°, 18.4°, 22.8°, 26.6°, and 30.0° are summarized in the columns labeled '530 nm'. The values represent the average for s- and p-polarized light, and so indicate the reflected power for unpolarized incidence. These values are most indicative of the anticipated performance of each plate, since they pertain to averages over the full range of incidence. Calculated values are also shown for 460 nm and 640 nm as a preliminary indication of the potential sensitivity of performance to wavelength, and thus the potential for the introduction of color in the transmitted light.

The second input/output plate shown in FIG. 3B incorporates a thin acrylic plate having a 100-nm thick coating of magnesium fluoride on both surfaces of the simple acrylic plate. This approximates a quarter-wave anti-reflective coating for 530-nm incidence. Magnesium fluoride was selected because it is a standard and well-developed alternative for anti-reflective coatings. In some cases, magnesium fluoride coatings may require a glass substrate. The performance with glass should be similar to that presented here for acrylic, since the indices of glass and acrylic are similar. Magnesium fluoride has an index of refraction approximately equal to 1.38, whereas an ideal quarter-wave coating would possess an index equal to 1.22. The magnesium fluoride coating substantially reduced the near-normal reflectivity of the acrylic plate, from 7.7 to 2.8 percent for 0≤θ≤12.9°, and only mildly diminished the near-grazing reflectivity, from 63.6 to 60.0 percent for 77.1°≤θ≤90°. The impact is to substantially diminish the on-axis reflection, while only slightly increasing the off-axis reflection and transmission. The net result is an increase in the on-axis transmission, to values very-nearly the same as those for the baseline of no plate. Thus, the net benefit for a standard AR-coated glass or acrylic plate can be approximately zero.

The third input/output plate shown in FIG. 3C incorporates a thin acrylic plate having a 100-nm thick coating of an index 1.22 material on both surfaces of the acrylic plate. This approximates a near-ideal quarter-wave coating for 530-nm incidence. Such a coating might be fabricated using

TABLE 1

Averaged simulated reflectivities

| Incidence angle, θi | Plate 1 (FIG. 3A) | | | Plate 2 (FIG. 3B) | | | Plate 3 (FIG. 3C) | | | Plate 4 (FIG. 3D) | | |
|---|---|---|---|---|---|---|---|---|---|---|---|---|
| | 460 nm | 530 nm | 640 nm | 460 nm | 530 nm | 640 nm | 460 nm | 530 nm | 640 nm | 460 nm | 530 nm | 640 nm |
| 0-12.9 | 7.8 | 7.7 | 7.5 | 3.2 | 2.8 | 3.1 | 0.1 | 0.2 | 1.1 | 0.2 | 0.3 | 1.4 |
| 0-18.4 | 7.8 | 7.7 | 7.5 | 3.2 | 2.8 | 3.2 | 0.1 | 0.2 | 1.2 | 0.2 | 0.4 | 1.5 |
| 0-22.8 | 7.8 | 7.7 | 7.6 | 3.1 | 2.8 | 3.2 | 0.0 | 0.2 | 1.3 | 0.2 | 0.5 | 1.6 |
| 0-26.4 | 7.8 | 7.7 | 7.6 | 3.1 | 2.8 | 3.2 | 0.0 | 0.3 | 1.3 | 0.2 | 0.6 | 1.8 |
| 0-30.0 | 7.9 | 7.7 | 7.6 | 3.1 | 2.9 | 3.3 | 0.0 | 0.3 | 1.4 | 0.2 | 0.9 | 2.0 |
| 60.0-90 | 32.5 | 32.6 | 32.5 | 27.2 | 27.8 | 29.0 | 21.5 | 24.0 | 26.6 | 39.2 | 42.7 | 48.0 |
| 63.4-90 | 36.5 | 36.7 | 36.6 | 31.3 | 32.0 | 33.1 | 25.5 | 28.0 | 30.7 | 43.0 | 47.0 | 52.3 |
| 67.2-90 | 41.8 | 42.1 | 42.0 | 37.0 | 37.7 | 38.7 | 31.0 | 33.7 | 36.3 | 47.8 | 52.2 | 57.5 |
| 71.6-90 | 49.7 | 50.2 | 50.0 | 45.6 | 53.9 | 47.1 | 39.6 | 42.2 | 44.8 | 55.3 | 59.2 | 64.1 |
| 77.1-90 | 62.6 | 63.6 | 63.5 | 59.7 | 60.0 | 61.0 | 54.6 | 56.8 | 59.2 | 66.9 | 69.6 | 73.9 |

The first input/output plate shown in FIG. 3A is a thin acrylic plate having an index of refraction represented by the measured wavelength-dependent index of PMMA resins used in multi-layer optical films. Representative values are 1.505 at 460 nm, 1.499 at 530 nm, and 1.493 at 640 nm. The assumption was that the acrylic had zero absorption, since reasonable purification can yield an absorptivity as low as 0.2% in$^{-1}$, and the plate may be as thin as 0.125 inches (3.175 mm) thick. The reflectivity of the simple acrylic plate fell far short of the ideal, both by possessing a near-normal value considerably greater than zero (7.7 percent for) 0≤θ≤12.9°, and a near-grazing value considerable less than one (63.6 percent for 77.1°≤θ≤90°. The on-axis transmission diminished considerably relative to the baseline of no plate. The off-axis reflection and transmission were significantly reduced, but the on-axis reflection was substantially increased, overwhelming the reductions and resulting in diminished on-axis transmission. The reductions of the off-axis reflection and transmission exhibit the enhanced near-grazing reflectivity of the simple acrylic plate. The increase in the on-axis reflection exhibits the non-zero near-normal reflectivity.

low-index materials such as those described in PCT Patent Publication WO2010/120468 entitled "Process and Apparatus for a Nanovoided Article". The near-ideal coating further reduced the near-normal reflectivity relative to the magnesium-fluoride-coated plate from 2.8 to 0.2 percent for 0≤θ≤12.9°, and further mildly reduced the near-grazing reflectivity from 60.0 to 56.8 percent for 77.1°≤θ≤90°. The impact is to again substantially reduce the on-axis reflection (to values less than one percent) while only slightly further increasing the off-axis reflection and transmission. The net result is a further increase in the on-axis transmission, to values now significantly larger than the baseline of no plate. While the on-axis transmission is approximately 90 percent for θi=12.9° in the absence of a plate, it is approximately 94 percent with the near-ideal AR-coated plate in place. The loss within the collimation zone is reduced from 10 percent with no plate present, to 6 percent.

The feasibility of sub-one-percent AR coatings on plastic is demonstrated, for example, in U.S. Pat. No. 5,856,018, which describes in part a method for creating a small number of alternating high- and low-index coherently-thick layers on an acrylic plate. Disclosed are measured normal-incidence reflectivities less than 0.5 percent at all wavelengths between 460 and 640 nm, and as small as 0.05 percent near the center of this band. It is to be understood that these single-interface reflectivities would be doubled for coatings on both major surfaces of an input or output plate, as described herein. Such levels of performance, when applied to very-low absorption acrylic plates, should enable on-axis transmissions comparable to those for the near-ideal quarter-wave plate of FIG. 3C.

The fourth input/output plate shown in FIG. 3D retains the very-low-reflectivity AR coating of FIG. 3C while incorporating an optical element embedded within the acrylic to increase the near-grazing reflectivity of the plate. The optical element was an angle dependent polymeric multilayer optical film such as those described, for example, in U.S. Pat. No. 7,094,461 (Ruff et al.) as a p-Polarizer film. This optical element was developed with the objective of increasing the near-grazing reflectivity of LCD-backlight gain-enhancement stacks without reducing their on-axis transmission. Such functionality can increase the off-axis contrast of LCD displays. The utility of this film in further increasing the on-axis transmission of bends in daylighting ducts was evaluated.

In one particular embodiment, the film includes alternating layers of biaxially oriented PET and an isotropic material whose indices of refraction closely match the in-plane indices of the PET. Since the layer pairs possess identical indices in the horizontal plane, their presence within the plate will be nearly unobservable at normal incidence (where both polarizations of incident light sense only the in-plane indices). Near grazing incidence, the p-polarized component of the incidence will sense primarily the out-of-plane indices, and thus the contrast between the alternating layers. With the layer thicknesses tuned to quarter-wave thicknesses for 380 nm≤λ≤780 nm in a linear gradient throughout the stack, the p-polarized reflectivity is enhanced by suppression of Brewster's phenomenon. Note that only the p-polarized reflectivity is affected and s-polarized incidence continues to sense only the in-plane components of the indices independent of the incidence angle.

The near-normal reflectivity of the plate shown in FIG. 3D is increased only slightly by the presence of the embedded angle dependent polymeric multilayer optical film stack, from 0.2 to 0.3 percent for 0≤θ≤12.9°. The near-grazing reflectivity is increased significantly, from 56.8 to 69.9 percent for 77.1°≤θ≤90°. The impact is to very-slightly increase the on-axis reflection, and slightly decrease the off-axis reflection and transmission. The net result is a slight increase in the on-axis transmission. While the on-axis transmission is approximately 94 percent for the near-ideal AR-coated plate, it is almost 96 percent with the angle dependent polymeric multilayer optical film embedded within this plate.

Even with the angle dependent polymeric multilayer optical film stack in place, the greatest detriment to on-axis transmission remains off-axis reflection and transmission. And these remain the primary cause of the persistent degradations in on-axis transmission with decreasing incident collimation. While the angle dependent polymeric multilayer optical film stack does engender an increase in the near-grazing reflectivity of the plate, it is insufficient in both magnitude and angular extent to closely approximate the effects of total internal reflection in the solid prism. The lack of a boost in the s-polarized reflectivity with matched in-plane indices of refraction is partly to blame; however, the savings in cost and weight with a hollow light duct can still be strong benefits compared to use of a solid prism design.

Following are a list of embodiments of the present disclosure.

Item 1 is a hollow light duct bend, comprising: an input plate; an orthogonal output plate adjacent to the input plate; and a diagonal reflector disposed at a 45 degree angle between the input plate and the output plate; wherein the input plate and the output plate each have a first low reflectivity for light incident within a collimation half-angle θ of the normal to the respective plate, and a second high reflectivity for light incident within a grazing angle (90-θ) of the normal to the respective plate.

Item 2 is the hollow light duct bend of item 1, wherein the collimation half-angle θ comprises an angle between about 10 degrees and about 30 degrees.

Item 3 is the hollow light duct bend of item 1 or item 2, wherein the first low reflectivity ranges between about 0% and about 8%.

Item 4 is the hollow light duct bend of item 1 to item 3, wherein the second high reflectivity ranges between about 20% and about 80%.

Item 5 is the hollow light duct bend of item 1 to item 4, wherein at least one of the input plate and the output plate comprise an acrylic plate.

Item 6 is the hollow light duct bend of item 1 to item 5, wherein at least one of the input plate and the output plate comprise an antireflective coating disposed on opposing major surfaces of each plate.

Item 7 is the hollow light duct bend of item 6, wherein the antireflective coating comprises MgF.

Item 8 is the hollow light duct bend of item 1 to item 7, wherein at least one of the input plate and the output plate comprise a low refractive index coating on opposing major surfaces of each plate.

Item 9 is the hollow light duct bend of item 1 to item 8, wherein at least one of the input plate and the output plate comprise a polymeric multilayer optical film.

Item 10 is the hollow light duct bend of item 1 to item 9, wherein at least one of the input plate and the output plate comprise a polymeric multilayer film laminated to an acrylic plate.

Item 11 is a hollow light duct bend, comprising: an input plate having a first low reflectivity for light incident within a collimation half-angle θ of the normal to the input plate, and a first high reflectivity for light incident within a grazing angle (90-θ) of the normal to the input plate; an output plate adjacent and orthogonal to the input plate and having a second low reflectivity for light incident within the collimation half-angle θ of a normal to the output plate, and a second high reflectivity for light incident within the grazing angle (90-θ) of the normal to the output plate; and a diagonal reflector between the input plate and the output plate, wherein an input light beam having light within the collimation half-angle θ that enters normal to the input plate, exits the output plate as an output light beam having light within the collimation half-angle θ.

Item 12 is the hollow light duct bend of item 11, wherein the collimation half-angle θ comprises an angle between about 10 degrees and about 30 degrees.

Item 13 is the hollow light duct bend of item 11 or item 12, wherein the first and the second low reflectivity ranges between about 0% and about 8%.

Item 14 is the hollow light duct bend of item 11 to item 13, wherein the first and the second high reflectivity ranges between about 20% and about 80%.

Item 15 is the hollow light duct bend of item 11 to item 14, wherein the diagonal reflector is disposed at a 45 degree angle to each of the normal to the input plate and the normal to the output plate.

Item 16 is a hollow light duct bend, comprising: an input plate disposed perpendicular to an input light propagation direction; an output plate disposed perpendicular to the input plate and perpendicular to an output light propagation direction; and a reflector disposed along a diagonal between the input plate and the output plate, wherein a partially collimated input light beam that enters the input plate and exits the output plate as a partially collimated output light beam, includes: a first portion that reflects from the reflector and passes through the output plate; a second portion that reflects from the reflector, reflects from the input plate, and then passes through the output plate; and a third portion that reflects from the output plate, reflects from the reflector, and then passes through the output plate.

Item 17 is the hollow light duct bend of item 16, wherein the partially collimated input light beam and the partially collimated output light beam each have a collimation half-angle between about 10 degrees and about 30 degrees.

Item 18 is the hollow light duct bend of item 16 or item 17, wherein an on-axis transmission of the partially collimated input light beam to the partially collimated output light beam is greater than about 87%.

Item 19 is the hollow light duct bend of item 16 to item 18, wherein an on-axis transmission of the partially collimated input light beam to the partially collimated output light beam is greater than about 90%.

Item 20 is a hollow light duct bend, comprising: at least one of an input plate or an orthogonal output plate adjacent to the input plate; and a diagonal reflector disposed at a 45 degree angle to the at least one input plate or the orthogonal output plate; wherein the input plate and the output plate each have a first low reflectivity for light incident within a collimation half-angle θ of the normal to the respective plate, and a second high reflectivity for light incident within a grazing angle (90-θ) of the normal to the respective plate.

Item 21 is the hollow light duct bend of item 20, wherein the collimation half-angle θ comprises an angle between about 10 degrees and about 30 degrees.

Item 22 is the hollow light duct bend of item 20 or item 21, wherein the first low reflectivity ranges between about 0% and about 8%.

Item 23 is the hollow light duct bend of item 20 to item 22, wherein the second high reflectivity ranges between about 20% and about 80%.

Item 24 is the hollow light duct bend of item 20 to item 23, wherein at least one of the input plate and the output plate comprise an acrylic plate.

Item 25 is the hollow light duct bend of item 20 to item 24, wherein at least one of the input plate and the output plate comprise an antireflective coating disposed on opposing major surfaces of each plate.

Item 26 is the hollow light duct bend of item 25, wherein the antireflective coating comprises MgF.

Item 27 is the hollow light duct bend of item 20 to item 26, wherein at least one of the input plate and the output plate comprise a low refractive index coating on opposing major surfaces of each plate.

Item 28 is the hollow light duct bend of item 20 to item 27, wherein at least one of the input plate and the output plate comprise a polymeric multilayer optical film.

Item 29 is the hollow light duct bend of item 20 to item 28, wherein at least one of the input plate and the output plate comprise a polymeric multilayer film laminated to an acrylic plate.

Item 30 is a light distribution system, comprising: the hollow light duct bend of item 1 to item 29; a mirror-lined hollow light duct connected to the hollow light duct bend; and a light source capable of injecting an input light beam into the mirror-lined hollow light duct.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A hollow light duct bend, comprising:
   a hollow bend segment for transmitting visible light comprising:
   an input plate;
   an orthogonal output plate adjacent to the input plate; and
   a diagonal reflector disposed at a 45 degree angle between the input plate and the output plate;
   wherein the input plate and the output plate each have a first low reflectivity for light incident within a collimation half-angle θ of a normal to the respective plate, and a second high reflectivity for light incident within a grazing angle (90-θ) of the normal to the respective plate, and wherein the first low reflectivity of the at least one light transmission plate ranges between about 0% and about 8%.

2. The hollow light duct bend of claim 1, wherein a maximum angle of the collimation half-angle θ is between about 10 degrees and about 30 degrees.

3. The hollow light duct bend of claim 1, wherein the second high reflectivity ranges between about 20% and about 80%.

4. The hollow light duct bend of claim 1, wherein at least one of the input plate and the output plate comprise an acrylic plate.

5. The hollow light duct bend of claim 1, wherein at least one of the input plate and the output plate comprise an antireflective coating disposed on opposing major surfaces of each plate.

6. The hollow light duct bend of claim 5, wherein the antireflective coating comprises magnesium fluoride.

7. The hollow light duct bend of claim 1, wherein at least one of the input plate and the output plate comprise a low refractive index coating on opposing major surfaces of each plate.

8. The hollow light duct bend of claim 1, wherein at least one of the input plate and the output plate comprise a polymeric multilayer optical film.

9. The hollow light duct bend of claim 1, wherein at least one of the input plate and the output plate comprise a polymeric multilayer film laminated to an acrylic plate.

10. A hollow light duct bend, comprising:
a hollow bend segment for transmitting visible light comprising:
an input plate having a first low reflectivity for light incident within a collimation half-angle $\theta$ of a normal to the input plate, and a first high reflectivity for light incident within a grazing angle (90-$\theta$) of the normal to the input plate;
an output plate adjacent and orthogonal to the input plate and having a second low reflectivity for light incident within the collimation half-angle $\theta$ of the normal to the output plate, and a second high reflectivity for light incident within the grazing angle (90-$\theta$) of the normal to the output plate; and
a diagonal reflector between the input plate and the output plate,
wherein an input light beam having light within the collimation half-angle $\theta$ that enters normal to the input plate, exits the output plate as an output light beam having light within the collimation half-angle $\theta$,
wherein the first and the second low reflectivity ranges between about 0% and about 8%.

11. The hollow light duct bend of claim 10, wherein a maximum angle of the collimation half-angle $\theta$ is between about 10 degrees and about 30 degrees.

12. The hollow light duct bend of claim 10, wherein the first and the second high reflectivity ranges between about 20% and about 80%.

13. The hollow light duct bend of claim 10, wherein the diagonal reflector is disposed at a 45 degree angle to each of the normal to the input plate and the normal to the output plate.

14. A hollow light duct bend, comprising:
a hollow bend segment for transmitting visible light comprising:
an input plate disposed perpendicular to an input light propagation direction;
an output plate disposed perpendicular to the input plate and perpendicular to an output light propagation direction; and
a reflector disposed along a diagonal between the input plate and the output plate,
wherein a partially collimated input light beam that enters the input plate and exits the output plate as a partially collimated output light beam, wherein the partially collimated input light beam includes:
a first portion that reflects from the reflector and passes through the output plate;
a second portion that reflects from the reflector, reflects from the input plate, and then passes through the output plate; and
a third portion that reflects from the output plate, reflects from the reflector, and then passes through the output plate, and
wherein the partially collimated input light beam and the partially collimated output light beam each have a maximum collimation half-angle between about 10 degrees and about 30 degrees.

15. The hollow light duct bend of claim 14, wherein an on-axis transmission of the partially collimated input light beam to the partially collimated output light beam is greater than about 87%.

16. The hollow light duct bend of claim 14, wherein an on-axis transmission of the partially collimated input light beam to the partially collimated output light beam is greater than about 90%.

17. A hollow light duct bend, comprising:
at least one light transmission plate; and
a diagonal reflector disposed at a 45 degree angle and adjacent to the at least one light transmission plate;
wherein the at least one light transmission plate has a first low reflectivity for light incident within a collimation half-angle $\theta$ of a normal to the at least one light transmission plate, and a second high reflectivity for light incident within a grazing angle (90-$\theta$) of the normal to the at least one light transmission plate, wherein a maximum angle of the collimation half-angle $\theta$ is between about 10 degrees and about 30 degrees;
wherein the at least one light transmission plate and the diagonal reflector form an air-filled bend segment for transmitting visible light.

\* \* \* \* \*